United States Patent [19]

Cushing

[11] 4,125,019

[45] Nov. 14, 1978

[54] PROBE TYPE ELECTROMAGNETIC FLOW METER WITH DEBRIS SHEDDING CAPABILITY

[75] Inventor: Vincent J. Cushing, Deerfield, Ill.

[73] Assignee: Monitek, Inc., Redwood City, Calif.

[21] Appl. No.: 807,288

[22] Filed: Jun. 16, 1977

[51] Int. Cl.² ............................................. G01F 1/58
[52] U.S. Cl. ............................................. 73/194 EM
[58] Field of Search ............... 73/181, 194 EM, 201, 73/273

[56] References Cited

U.S. PATENT DOCUMENTS

| | | | |
|---|---|---|---|
| 3,529,591 | 9/1970 | Schvette | 73/194 EM X |
| 3,668,931 | 6/1972 | Zanker et al. | 73/181 |
| 3,903,741 | 9/1975 | Greene | 73/181 |

*Primary Examiner*—Charles A. Ruehl
*Attorney, Agent, or Firm*—Pollock, Vande Sande & Priddy

[57] ABSTRACT

A probe type magnetic flow meter is arranged for accurate measurement in environments which exhibit debris especially debris which is of a character which may tend to cling to the probe. The probe, which has a longitudinal axis, is mounted to be immersed in the flowing liquid medium, and is constrained by a coupling so that the angle between the longitudinal axis and a direction perpendicular to direction of flow of the flowing medium is an acute angle of at least a predetermined magnitude, for example, at least 45°. Typically, the probe may be attached to a mounting collar or rod which is, in turn, supported by an adapter which may then be slip-fit into a pipe and some or all of these components, in addition to the probe itself, may be immersed in the flowing liquid medium. The leading edge of all apparatus immersed in the flowing liquid medium is arranged in such a way that debris contacting this apparatus is subjected to natural force from the flowing liquid medium resulting in motion of the debris in a direction generally parallel to the longitudinal axis of the transducer until the debris reaches the furthest extent of the probe and is shed. Embodiments are disclosed wherein the probe measures velocity and open channel flow or in pressure flow, for example, in a full conduit.

11 Claims, 8 Drawing Figures

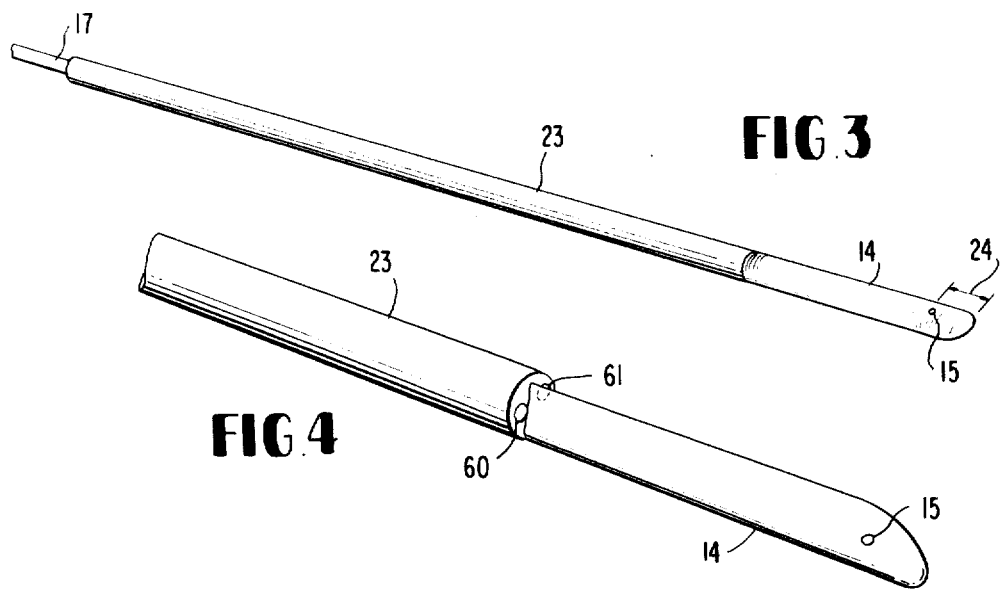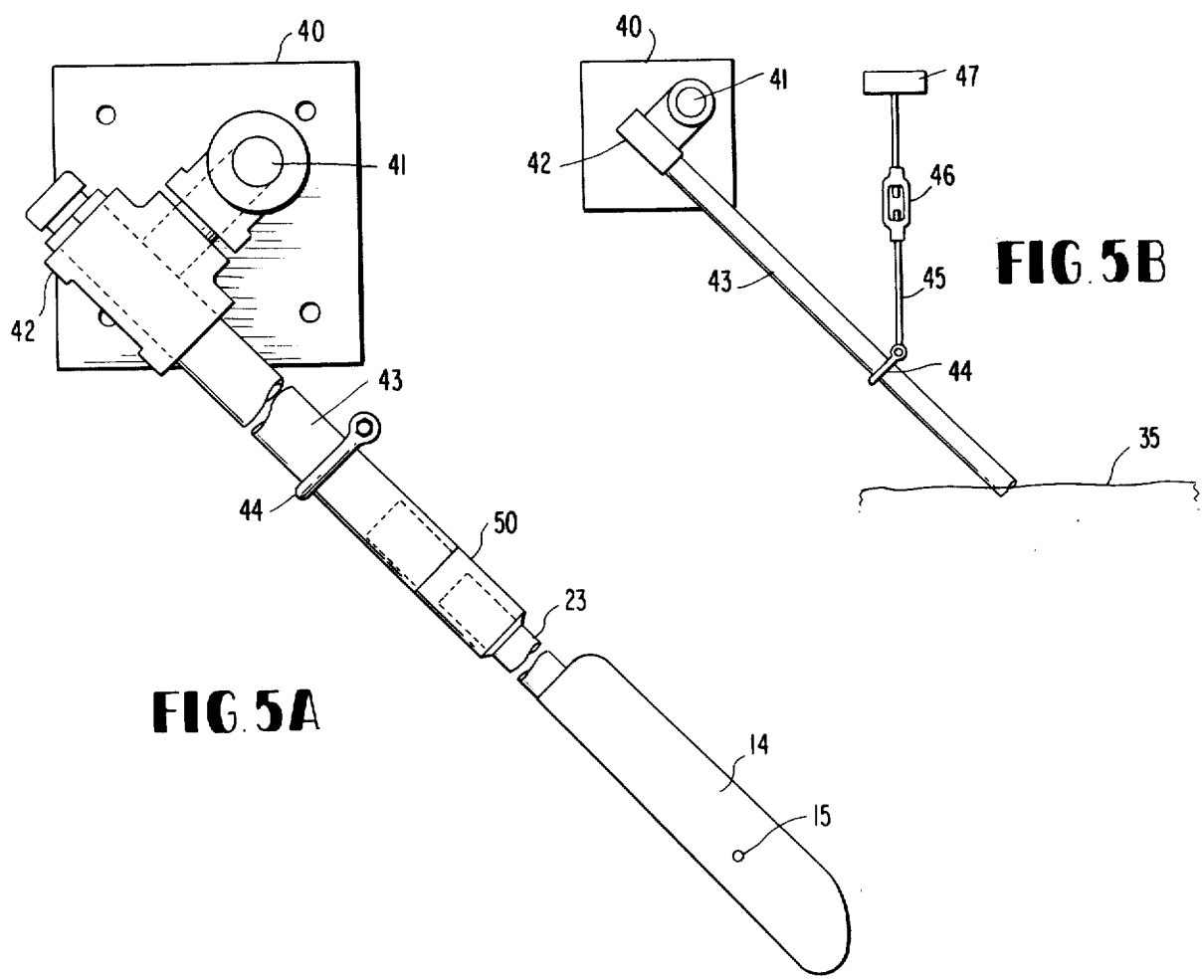

$32 \sin \theta = 34$
$32 \cos \theta = 33$
$\mu\ 32 \cos \theta < 32 \sin \theta$
$\mu < \tan \theta$

PROBE TYPE ELECTROMAGNETIC FLOW METER WITH DEBRIS SHEDDING CAPABILITY

FIELD OF THE INVENTION

The present invention relates to flow measurement devices of the magnetic type.

BACKGROUND OF THE INVENTION

The measurement of fluid velocity has been accomplished employing a variety of devices one of which is the magnetic flow meter. Magnetic flow meters are employed where the fluid whose velocity is to be measured is minimally conductive and employ the Faraday principle. In particular, a magnetic field is generated and sensing electrodes are provided to sense a voltage induced therein which can then be processed to obtain a measure of the fluid velocity. Magnetic flow meters come in two general forms; in one form, the magnetic field is generated by a magnet which surrounds the fluid flow, and in another arrangement, the fluid flow surrounds the magnet generating the magnetic field. The present invention deals with the latter type of flow meter, an example of which is described in my prior U.S. Pat. No. 3,855,858. This type of magnetic flow meter will be referred to in this application as a probe type flow meter.

While the voltages induced in the electrodes in the probe are accurate representations of the fluid velocity in the vicinity of the electrodes, the user normally extrapolates from the flow meter readings to obtain flow rates. For such flow rates to be accurate, the fluid velocity in the vicinity of the probe should give an accurate indication of the "average" flow velocity. One factor which will prevent accurate extrapolation is local perturbations in the fluid velocity in the vicinity of the probe. Such perturbations can arise from a variety of sources, at least one of which is the probe itself or the manner in which it is supported or mounted. In cases where the probe is in an environment in which the flowing medium is non-homogeneous, perturbations in the flow can arise as a result of the non-homogeneous nature of the medium. One particularly significant non-homogeneous medium in which flow meters may be used is waste water, sewage, or the like which may include debris.

In those cases where debris is generally of limited mass and rigid, while the debris may contact the flow meter and induce short term perturbations in the flow velocity readings, such debris will not usually introduce long term perturbations or errors. On the other hand, where the debris is non-rigid, for example, cloth, strings, or even partially dissolved particulate matter such as paper pulp, the debris may cling or "stick" to the probe. Under such circumstances, the velocity perturbations caused by such debris may well introduce longer lasting errors in the flow meter signals.

It is therefore an object of the present invention to provide a magnetic type flow meter which is arranged so as to tend to shed debris, even debris of the non-rigid type such as rags, cloth, strings, or "sticky" semi-dissolved matter. Since environments in which flow measurements are required, which include debris of the type mentioned above can exist in open channel flow or in pressure flow (such as in pipes) it is another object of the present invention to provide a magnetic flow meter of the probe type which is arranged to provide accurate flow measurements in flow of non-homogeneous media in either open channel or pressure flow.

SUMMARY OF THE INVENTION

The present invention meets these and other objects of the invention by providing a probe type magnetic flow meter which may be of circular cross section or steamlined which is mounted in a swept back configuration. More particularly, the probe type flow meter has a longitudinal axis, and it is mounted with a longitudinal axis of the flow meter forming an acute angle of at least a predetermined magnitude with a direction perpendicular to the direction of flow of the medium. In open channel flows the probe may be supported on a rigid support by a coupling means establishing the desired angle. In pressure flow environments, a rigid support is provided through which the probe is inserted into the pipe or the like, and it is the configuration of the rigid support which determines the angle made by the probe with the direction of fluid flow.

The minimum swept back angle is determined by the desirable function produced thereby. More particularly, with zero sweep back, typically employed in the prior art, clinging type debris impacting the probe is maintained in contact with the probe as the result of the natural force exerted by the flowing liquid, and there is no component of this force which tends to move the debris off the probe or to cause the debris to be "shed". As the sweep back angle is increased, the force component tending to shed the debris increases and the force component (frictional) tending to maintain the debris in contact with the probe decreases. Depending upon the particular type of debris, a sweep back angle is reached at which the force tending to shed the debris exceeds the frictional force tending to maintain the debris in contact with the probe. The sweep back angle is the minimum usable sweep back angle. Usually a practical environment will include different types of debris, and accordingly, the highest minimum usable sweep back angle for the debris encountered in the environment is necessary in order to assure that the probe will shed debris. I have found that generally 45° is sufficient, although in certain instances, particularly where the debris is "sticky" such as in paper pulp, the swept back angle should be increased, for example, to 60°.

Inasmuch as debris may also come into contact with structures coupling the probe to a support, these structures must also be configured so as to facilitate debris shedding at least in the vicinity of the sensor. Particularly important is the interface between different coupling devices or portions thereof, and especially the leading edge of such interfaces. Since the use of sweep back is to facilitate debris shedding, care must be taken that the leading edge of the probe as well as other apparatus with which debris may come in contact does not prevent or inhibit debris shedding. Detents, depressions, notches and the like can serve to inhibit or prevent debris shedding by "trapping" debris. As a result, such detents, depressions, notches and the like are to be avoided especially at the leading edge of the probe as well as any other structures coupling the probe to a support which may come into contact with debris.

Accordingly, the invention includes an electromagnetic flow sensor capable of debris shedding for accurate flow measurement in environments which include non-rigid debris, comprising a rigid support, a flow transducer having a longitudinal axis adapted to be immersed in a moving liquid medium flowing in a defined direction, coupling means coupling the flow transducer to the support, the coupling means limiting the flow transducer orientation to maintain the angle between longitudinal axis of the flow transducer and a perpendicular to the defined direction above a minimum angle with the leading edge of the flow transducer as well as portions of the coupling devices immersed in the medium shaped to facilitate debris shedding as a result of forces exerted on the debris by the moving medium.

BRIEF DESCRIPTION OF THE DRAWINGS

Several embodiments of the invention will now be described in further detail in connection with the attached drawings in which like reference characters identify identical apparatus and in which:

FIG. 3 illustrates a streamlined flow transducer and collar;

FIG. 4 is a view of a similar streamlined flow transducer illustrating the placement of scrubbing nozzles;

FIGS. 5A and 5B illustrate a flow transducer adapted to be mounted in an open channel;

DETAILED DESCRIPTION OF PREFERRED EMBODIMENTS

Figure 1:
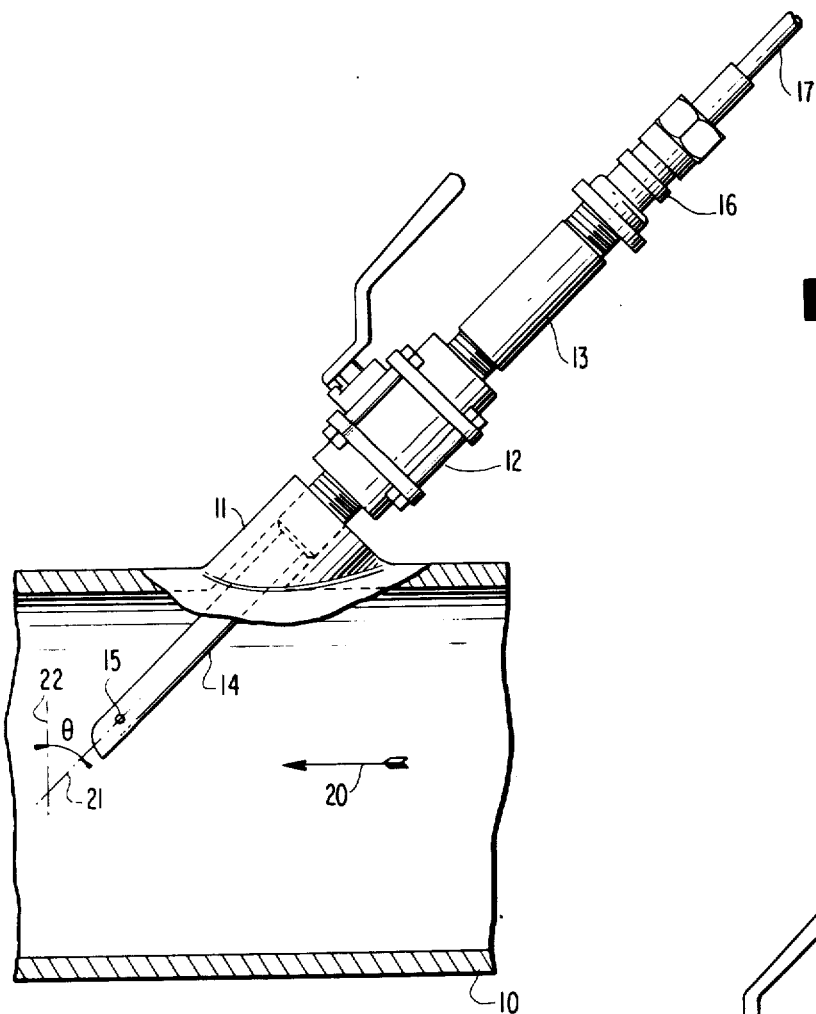
FIG. 1 illustrates a probe type flow transducer mounted for measuring flow in a closed vessel through a pipe mount.

The present invention relates to magnetic flow transducers adapted, to measure a fluid flow in non-homogeneous environments, i.e., environments in which the fluid flow includes solid or semi-dissolved rigid and non-rigid particulate matter. As mentioned above, such matter may disturb the flow measurement as it passes the flow transducer. This effect is, however, transitory and therefore of minor significance. On the other hand, especially with non-rigid and semi-dissolved particulate matter, the matter can cling or "stick" to the transducer surface or the surface of transducer supports. Under those circumstances, the presence of the matter will disturb the flow past the transducer, and it will do so for a relatively much longer time than the transitory phenomena caused by such matter merely moving past the flow transducer.

Conventional transducers, whether streamlined or not, are normally inserted or supported in the moving medium with the longitudinal axis of the transducer directed perpendicular to the direction of flow. In this condition, the natural flow forces will tend to retain a non-rigid or semi-dissolved matter on the transducer.

The present invention employs two techniques to assist the transducer in "shedding" such objects. The transducer is inserted and/or supported in the flow such that the transducer's longitudinal axis forms an acute angle with a perpendicular to the flow direction, and the angle is maintained above a predetermined minimum. A practical value for the direction between the longitudinal axis of the transducer and a direction perpendicular to fluid flow is 45°; in some circumstances, this may be increased to 60°. This configuration, hereinafter referred to as sweep back, assists in shedding any objects which contact the transducer. The natural flow forces, with the transducer included as mentioned, have a component parallel to the axis of the transducer. This force component assists in shedding the objects as it tends to move the object along the transducer surface until it reaches the tip of the transducer at which point the object is "shed".

However, in order for this component of the natural flow forces to be effective, there must be no detents, depressions, notches or the like at the leading edge of the transducer or supporting immersed structures which can "trap" debris and prevent its being shed. If the leading edge of the transducer and supporting immersed structures are viewed as a directed line, from the surface of the medium or the point at which the structure enters the medium, to the extreme tip of the flow transducer, then if the leading edge is an unbroken straight line, objects impacting the transducer will not be caught or trapped, and the natural flow forces will tend to cause the debris to be shed. On the other hand, if the leading edge is not a straight line, it should be of the "step-down" variety in which the components of the leading edge can be resolved into straight line segments none of which has any component directed opposite the direction of flow. If the directed line segments which make up the leading edge of the transducer and supporting structures do have a component directed opposite the direction of flow, such a profile will be hereinafter termed a "step-up" profile which has a tendency to "trap" debris moving along the leading edge of the transducer under natural flow forces. Such "step-up" profile is to be avoided.

As is well known in the art, the operative components of the transducer itself include a source of an electromagnetic field and at least a pair of electrodes as well as a hydrodynamic shape enclosing the source and electrodes and some means of connecting the voltages sensed by the electrodes to a measuring device. Optionally, a power source external to the transducer may be connected to the source of the electromagnetic field for powering the same. The hydrodynamic shape of the transducer itself can be either streamlined or non-streamlined, and an example of a non-streamlined transducer is disclosed in the previously mentioned patent.

Figure 2:
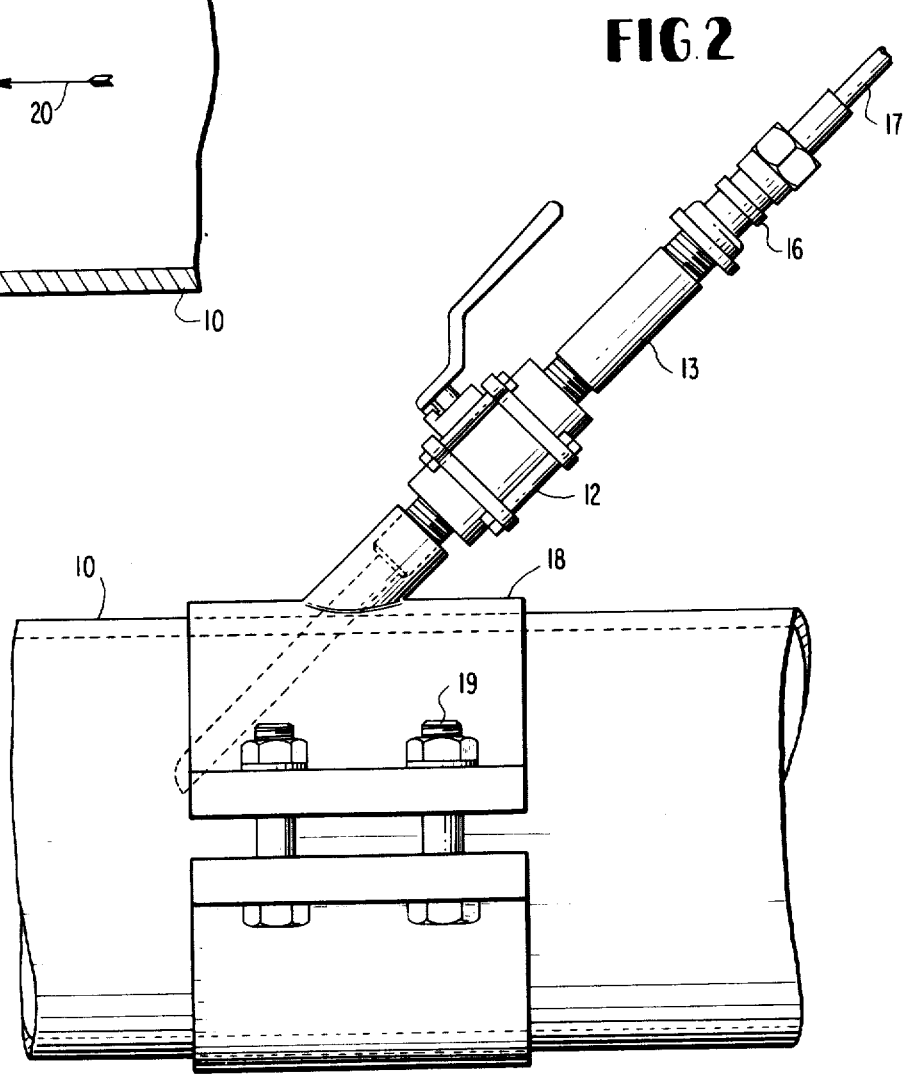
FIG. 2 is similar to FIG. 1 except that the flow transducer is mounted by a clamp-on sleeve.

FIGS. 1 and 2 illustrate a transducer arranged to measure flow in a pressure flow situation, i.e., in a conduit or pipe. Thus, as shown in FIG. 1, a pipe 10 has a fluid flowing in it in a direction indicated by the arrow 20. A pipe mount 11 is welded onto the surface of the pipe and integral therewith, and a hole is drilled through the pipe mount as well as through the wall of the pipe. Fixedly attached to the pipe mount is a ball valve 12 and attached to the end of the ball valve 12 opposite the pipe mount is a cylinder 13. The free end of the cylinder 13 includes a seal 16 and as is illustrated in FIG. 1, the sensor collar and cable 17 emerge from the seal 16.

FIG. 1 illustrates the interior of the pipe as if it were transparent, and shows the transducer 14 extending from the inner surface of the pipe through the pipe mount 11. In the embodiment illustrated in FIG. 1, the transducer is a streamlined transducer which includes a pair of sensing electrodes, one of which, electrode 15, is illustrated. As shown in FIG. 1, the longitudinal axis 21 of the transducer 14 makes an angle $\theta$ with a direction 22 perpendicular to the direction of flow 20. This is the sweep back angle, and the embodiment of FIG. 1 is determined by the angle at which the pipe mount is canted onto the pipe.

Although the flow transducer itself is streamlined, the collar therefor (not illustrated) which is rigidly supported in the pipe mount 11, ball valve 12 and cylinder 13 need not be streamlined and can, for example, be a cylinder of circular cross section and typically the steamlined flow transducer is faired into the circular cylindrical support. The ball valve 12 (or equivalent) allows extraction of the sensor from pipe 10 without the flowing medium leaking from the hole in the pipe wall at the location of the pipe mount 11.

FIG. 2 illustrates another embodiment for employing the flow transducer in a pressure flow situation, i.e., in a closed conduit 10. As shown in FIG. 2, the same ball valve 12, cylinder 13, seal 16 and cable 17 are illustrated. However, the canted pipe mount 11 is now emplaced on a pipe repair sleeve 18. The clamp-on sleeve 18 has an internal diameter equal to the outside diameter of the conduit or pipe 10 and is maintained in close fitting relationship therewith by means of bolts 19 and fittings therefor integral with sleeve 18. Entrance through the sleeve and pipe wall is through a fitting integral with the sleeve, illustrated in FIG. 2.

FIG. 3 is a view of a flow transducer and collar or rod 23. As illustrated in FIG. 3, the flow transducer 14 is streamlined and includes a detection electrode 15 spaced from the outer extremity of the flow transducer by a distance illustrated by reference character 24. The streamlined flow transducer shape is faired into the circular cross section of the collar 23. Also illustrated in FIG. 3 is the cable 17 exiting from one end of the collar 23. This cable is employed for necessary electrical connections. The collar 23 need not be of circular cross-section, although, if it is, sealing in the ball valve 12 can employ a circular O-ring. Since non-circular sealing structures are available the collar 23 can have any cross section which can be sealed to.

Typical parameters for the transducer 14 and rod 23 are a ⅜ inch diameter for the collar 23 which is 25 inches long (collar length varies with the application). The streamline portion of the transducer 14 is six inches long and the electrode 15 is 1¼ inches from the extremity of the transducer.

FIGS. 5A and 5B relate to open channel installations, i.e., where the flowing medium has an exposed upper surface, such as the surface 35 shown in FIG. 5B. FIG. 5B illustrates, in schematic form, the supports for the transducer in relation to the exposed upper surface 35 of the open channel. More particularly, a rigid support 40, mounted to means not shown, has a freely pivotable joint 41 coupling the support to a pipe holder 42. The support for the transducer itself, not illustrated in FIG. 5B, is a pipe 43 coupled to the pipe holder 42. By reason of the pivotable joint 41 the pipe 43 and the flow transducer attached at its free end is capable of achieving any angle $\theta$ with respect to a perpendicular to the direction of flow. However, a further coupling device including, for example, a U-bolt clamp 44, a support 45, which can be a rigid rod or a chain, turn buckle 46, and a support 47 are arranged to maintain the angle $\theta$ at least equal to the predetermined minimum.

FIG. 5A is a more detailed illustration of the foregoing components, particularly illustrating the portion of the apparatus below the free upper surface 35 of the flowing medium. More particularly, as is illustrated in FIG. 5A, the pipe 43 which may be for example, a one inch schedule 40 pipe is fitted to an adapter 50. Into the adapter 50 is inserted the collar 23 which supports the transducer 14.

As illustrated in FIG. 5A, the outside diameter of the adapter 50 is greater than the outside diameter of the rod 23 thus achieving a "step-down" configuration which does not present any depressions, notches or detents capable of "trapping" debris and preventing it from being shed by the sweep back. The interface between the adapter 50 and the pipe 43 is, as illustrated in FIG. 5A, smooth, i.e., the outside diameters are substantially equal. If the interface between the adapter 50 and the pipe 43 is to be immersed in the flowing liquid, it is essential that the outside diameter of the adapter 50 not be greater than the outside diameter of pipe 43, otherwise were this interface below the medium surface, it would present a notch or detent which is capable of trapping debris.

As illustrated in FIG. 5A, the interface between rod 23 and the leading edge of the sensor 14 presents no change in leading edge outside diameter. Of course, if desired, a "step-down" change could be employed much as the step-down which is illustrated in the adapter 50 at its joint with the rod 23. To be avoided, of course, is a "step-up".

Figure 7:
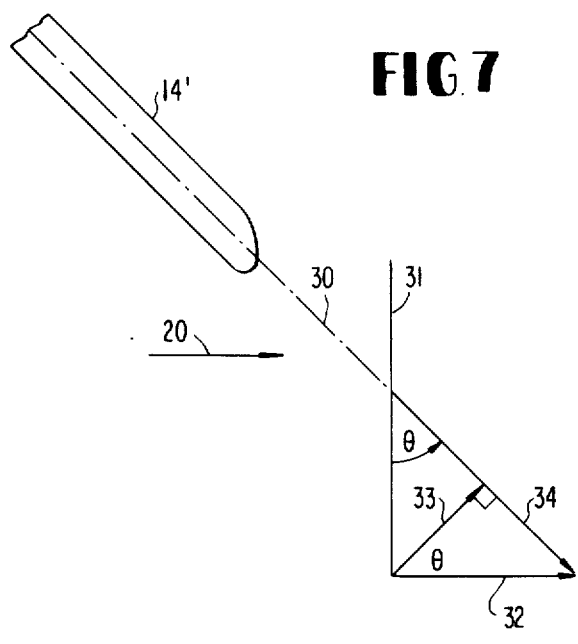
FIG. 7 is a schematic illustration of the sweep back angle, and the manner in which the minimum swept back angle can be determined.

FIG. 7 illustrates the geometry and the manner in which the minimum angle $\theta$ is determined. More particularly, as shown in FIG. 7, the transducer 14' (which may be steamlined or nonstreamlined) has a longitudinal axis 30 and is immersed in flowing liquid medium which has a direction of flow 20. Theta is the angle between the axis 30 and a direction 31 perpendicular to the flow 20. The natural flow forces exerted on the surface of the transducer 14' are represented by vector 32 having direction and magnitude. This force can be resolved into two components. A first component 33 is perpendicular to the axis 30, and a second component 34 parallel thereto. It is the component 34 which assists in shedding debris in that the force tends to move the object toward the tip of the transducer at which point it can be shed. On the other hand, the component 33 provides a frictional force opposing the component 34. If we denote the frictional coefficient as $\mu$ then desirably 32 $\mu$ cosine $\theta$ should be smaller than 32 sine $\theta$. This results in the relationship that tangent $\theta$ should be greater than $\mu$ and thus a minimum angle $\theta$ is thereby defined. As mentioned above, 45° appears to be a preferable direction, although angle $\theta$ may be increased to 60° for semi-dissolved particulate matter, which may be "sticky" such as those found in paper pulp.

Figure 6:
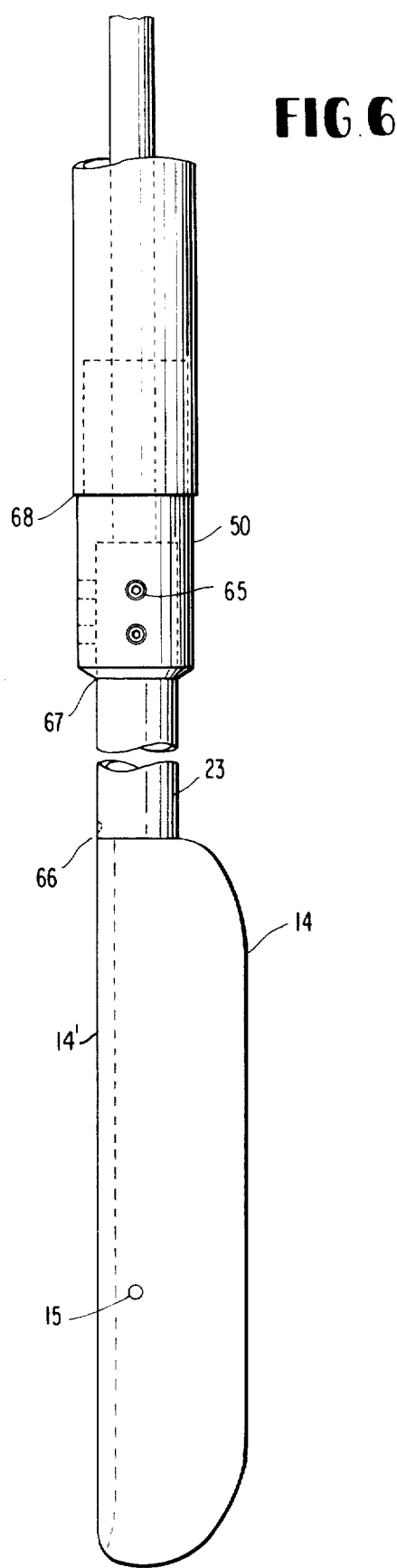
FIG. 6 is a further illustration of a flow transducer specifically illustrating one mounting arrangement.

FIG. 6 illustrates in greater detail flow transducer 14, collar 23 and adapter 50. As shown, set screws 65 maintain the collar 23 and adapter 50 in united condition. To prevent any depressions, notches, detents or the like especially in leading edges, the set screws 65 are depressed beneath the outer surface of adapter 50.

Of particular interest is the interface 66, between collar 23 and transducer 14; 67 between collar 23 and adapter 50; and 68 between adapter 50 and pipe 43. The latter two interfaces 67 and 68 are of the "step-down" variety, while the former is smooth.

Two further techniques can be employed to assist in an accurate measurement of flows in various non-homogeneous environments. One technique, illustrated in FIG. 4, is to provide a scrubbing flow from nozzles 60 and 61 in the rod 23. The nozzles may communicate with interior tubes to a source of scrubbing fluid such as water, air or even steam. Based on empirical study, the scrubbing flow may be allowed to proceed on a timed basis by opening and closing a valve between a source of scrubbing fluid and the nozzles 60 and 61. The nozzles are shaped and aimed such that the scrubbing flow exiting from the nozzles in the presence of the flow 20 of the medium will exert a scrubbing or cleaning action in the vicinity of the electrodes 15 on the transducer 14. In line with the previous discussion, the nozzles 60, 61 and housing should not present a "step-up" profile capable of "trapping" debris.

A second technique which is particularly useful in corrosive environments is to employ a flow transducer 14, and perhaps rod 23 having replaceable surfaces. The replaceable surface may be the leading edge as shown in FIG. 7 at 14', or may be a larger surface. Again, based on empirical studies, depending upon the particular corrosive environment, the replaceable surfaces may be replaced before the flow transducer's performance is sufficiently degraded to affect the measurements being conducted.

Although not illustrated herein, non-streamlined sensors can be used in place of the illustrated streamlined sensors. The preferable streamlined sensor has a conventionally rounded leading edge and sharper trailing edge.

If non-streamlined sensors are employed it is important to ensure that appurtenant supports not present "step-up" profiles.

A counter-indication for non-streamlined sensors is that it tends to shed Karman vortices with a periodicity proportional to flow velocity. The resulting effect is to subject the sensor to transverse vibrating forces. This is not fatal to use of these sensors but they must be arranged with sufficient rigidity to withstand such transverse forces.

There is an optimum distance of penetration of a pipe for accuracy in flow measurement, which distance is a function of pipe diameter. By providing adjustability of the penetration of the pipe mount by the sensor and collar combination optimum measurement conditions can be attained. Because the seal or other securing means for the sensor and collar may be loosened and tightened to permit axial adjustment of the penetration of the pipe by the sensor, the invention facilitates the attainment of optimum measuring positions.

What is claimed is:

1. An electromagnetic flow sensor capable of debris shedding for accurate flow measurement in environments which include rigid or non-rigid debris comprising:
   a rigid support,
   a flow transducer, having a longitudinal axis, adapted to be immersed in a moving liquid medium flowing in a defined direction, said flow transducer including at least a pair of electrodes, said at least a pair of electrodes lying on a line perpendicular to said axis,
   coupling means coupling said flow transducer to said support for maintaining an acute angle at least equal to a predetermined quantity greater than zero between said longitudinal axis and a perpendicular to said defined direction,
   a leading edge of said flow transducer and those portions of said coupling means adapted to be immersed in said medium shaped to result in motion of the debris contacting said leading edges in a direction generally parallel to said longitudinal axis and away from said rigid support whereby debris contacting said leading edges is shed thereby.

2. The apparatus of claim 1 wherein said moving liquid medium is constrained in an enclosed pipe, said rigid support comprising a pipe mount integral with said pipe and including a passage therethrough for said flow transducer and coupling means, said passage and pipe mount maintaining said flow transducer orientation.

3. The apparatus of claim 2 wherein said rigid support includes valve means and rigidly mounted thereto, a cylindrical tube within which said coupling means is restrained, said cylindrical tube inclined at said angle.

4. The apparatus of claim 1 wherein said medium is in an open channel, said rigid support suspended above an upper surface of said medium and including means defining said angle.

5. The apparatus of claim 1 wherein said angle is at least 45°.

6. The apparatus of claim 1 wherein said angle is between 45° and 60°.

7. The apparatus of claim 1 wherein said leading edge is free of detents and/or notches capable of trapping debris therein against natural flow forces exerted by said moving medium.

8. The apparatus of claim 1 wherein said leading edge is viewed as a directed line segment, has no components opposite said direction of flow.

9. The apparatus of claim 1 wherein said coupling means further includes nozzle means for directing a scrubbing flow against said flow transducer.

10. The apparatus of claim 9 wherein said scrubbing flow comprises a fluid selected from a group consisting of air, water and steam.

11. The apparatus of claim 1 wherein said flow transducer includes a removably mounted component including at least said leading edge.

* * * * *